United States Patent
Kofler

(10) Patent No.: US 8,493,192 B2
(45) Date of Patent: Jul. 23, 2013

(54) IMMOBILIZER CIRCUIT

(75) Inventor: Robert Kofler, Graz-Kroisbach (AT)

(73) Assignee: NXP B.V., Eindhoven (NL)

( * ) Notice: Subject to any disclaimer, the term of this patent is extended or adjusted under 35 U.S.C. 154(b) by 368 days.

(21) Appl. No.: 12/917,003

(22) Filed: Nov. 1, 2010

(65) Prior Publication Data

US 2012/0105219 A1    May 3, 2012

(51) Int. Cl.
*B60R 25/10* (2013.01)

(52) U.S. Cl.
USPC ............. 340/426.16; 340/436; 340/464

(58) Field of Classification Search
USPC ............. 340/426.16, 426.13, 426.14, 426.28, 340/426.3, 438–439, 435, 436, 463–464
See application file for complete search history.

(56) References Cited

U.S. PATENT DOCUMENTS

| | | | | |
|---|---|---|---|---|
| 6,175,308 B1 * | 1/2001 | Tallman et al. | ......... | 340/539.11 |
| 6,946,950 B1 * | 9/2005 | Ueno et al. | .............. | 340/10.1 |
| 7,248,143 B2 * | 7/2007 | Emmerling et al. | ......... | 340/5.62 |
| 2007/0115192 A1 | 5/2007 | Brandwein, Jr. | | |
| 2007/0142088 A1 * | 6/2007 | Boh et al. | ................... | 455/562.1 |
| 2007/0222563 A1 * | 9/2007 | Shimomura | ............. | 340/426.11 |
| 2010/0141389 A1 * | 6/2010 | Hagl et al. | ................... | 340/10.1 |
| 2010/0225547 A1 | 9/2010 | Lan et al. | | |

FOREIGN PATENT DOCUMENTS

| | | |
|---|---|---|
| JP | 2010-143375 A | 7/2010 |
| WO | 2009/027465 A2 | 3/2009 |
| WO | 2009/027466 A1 | 3/2009 |

OTHER PUBLICATIONS

Extended European Search Report for European patent appln. No. 11186837.8 (Mar. 8, 2012).

* cited by examiner

*Primary Examiner* — Daniel Previl

(57) ABSTRACT

An immobilizer device is configured for communicating with a base station. The immobilizer device includes an antenna circuit including three orthogonally-oriented antennas configured to receive a signal from a field generated by a base station. A power circuit is configured to draw power via the field on each of the antennas, and a communications circuit is configured to communicate with the base station via any of the antennas. The strength of the signals received via the antennas is evaluated and used to select one of the antennas for use in data communications and, if appropriate, as a power supply.

20 Claims, 4 Drawing Sheets

IMMOBILIZER CIRCUIT

Aspects of various embodiments of the present invention are directed to wireless communications, and particular aspects are directed to wireless communications for both power and data transmission.

Many wireless communication systems employ transponders and base stations that communicate with one another. One type of transponder used in many applications is an immobilizer type of transponder. Generally, immobilizers use a coil that can be aligned with an antenna at the base station along an axis to achieve coupling. This coupling is used to control the operation of a circuit at a base station with which the transponder communicates, such as to immobilize an automobile ignition in absence of coupling with the coil (e.g., with the coil implemented in a key fob).

In many immobilizer systems, such as a vehicle ignition system, the immobilizer needs to be oriented in a particular manner in order to communicate with the base station portion of the system. For instance, most applications use cylindrical coils (antennas), one for the base station and one for the immobilizer. The coupling between the two antennas is strongly dependent on the orientation, and the maximum coupling can be achieved if both antennas are kept on the same axis (coaxial operation). If the base station antenna area is much larger than the transponder antenna, real coaxial operation is not necessarily needed, but the axis of the transponder antenna is desirably held close to a center axis of the base station antenna. These approaches are often limited to applications with a very small angular deviation and a correspondingly small dihedral angle, in a range of a few millimeters. Some approaches to achieving this orientation involves the physical placement of the immobilizer (and related housing and other components) into a physical apparatus or slot that aligns the immobilizer with the base station. For instance, with many automobile immobilizer applications, the immobilizer works via insertion into a slot that ensures that the immobilizer is correctly oriented relative to the base station.

Unfortunately, such alignment systems can be difficult to use, expensive to implement and otherwise limit the ability to readily implement transponder-based operations. For instance, free hand operation in which the car key fob is kept in hand or on a user's person has been limited, generally requiring that the user ensure that the fob is positioned correctly and is otherwise appropriately aligned. Regarding vehicular ignition operation, such systems can be particularly challenging to implement in a manner that permits secure operation while also ensuring operability in the event of power loss on the transponder.

These and other matters have presented challenges to the design and implementation of immobilizer systems for a variety of applications.

Various example embodiments are directed to immobilizer devices and their implementation.

According to an example embodiment, an immobilizer device communicates with a base station for operation of a circuit connected to the base station. The immobilizer device includes an antenna circuit, a wireless power circuit, a communications circuit and a logic circuit. The antenna circuit includes three antennas orthogonally-oriented relative to one another, each antenna being configured to receive wireless transmissions from a remote base station. The wireless power circuit is connected to the antenna circuit and configured to provide power using signals received from the base station via at least one of the three antennas. The communications circuit is powered by the wireless power circuit, is connected to the antenna circuit and generates signals corresponding to the received wireless transmissions on each of the antennas. The communications circuit further provides data communications received from the base station via at least one of the channels (e.g., to the logic circuit), and transmits data (e.g., from and/or at the direction of the logic circuit) to the base station via an antenna corresponding to one of the channels. The logic circuit processes data communications on at least one of the channels, and to generate a data communication for transmission to the base station using the communications circuit and the one of the antennas corresponding to the at least one of the channels.

Another example embodiment is directed to an immobilizer key fob device for communicating with a base station for an automobile ignition circuit. Such an ignition circuit uses data from the immobilizer to operate (e.g., without a communication from the immobilizer, the ignition circuit will not start the vehicle). The immobilizer key fob device includes an antenna circuit having three orthogonally-oriented antennas that respectively generate input signals on three different antenna channels, and that align with a field generated by a single-antenna in the base station for receiving RF communications from the base station. A power circuit generates a supply voltage using an input radio frequency (RF) signal received from the base station on at least one of the antennas. Demodulator and modulator circuits respectively demodulate a signal on one of the channels based upon the strength of the signal, and modulate a carrier signal for data transmission back to the base station. A memory circuit stores authentication data and program data that is used by a logic circuit, which executes the program data to process data received via the demodulated signal. The logic circuit also generates output data for communication back to the base station via the modulator circuit and antennal circuit, using the stored authentication data.

Another example embodiment is directed to a method for communicating with a remote base station using RF power. An antenna circuit having three antennas orthogonally-oriented relative to one another is used to receive wireless transmissions from the base station. The wireless transmissions received on the antenna circuit are used to generate power that is used to power a logic circuit. Signals corresponding to the received wireless transmissions on each of the antennas are generated, and each generated signal is provided on a channel corresponding to the antenna from which the signal was generated. Data communications received from the base station are provided via at least one of the channels to the logic circuit. In the logic circuit, data communications received on at least one of the channels is processed, and a data communication is generated for transmission to the base station using the communications circuit and the one of the antennas corresponding to the at least one of the channels. The generated data communication is transmitted to the base station via an antenna corresponding to one of the channels, and may be used, for example, to enable an ignition circuit for a vehicle.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

Figure 1:
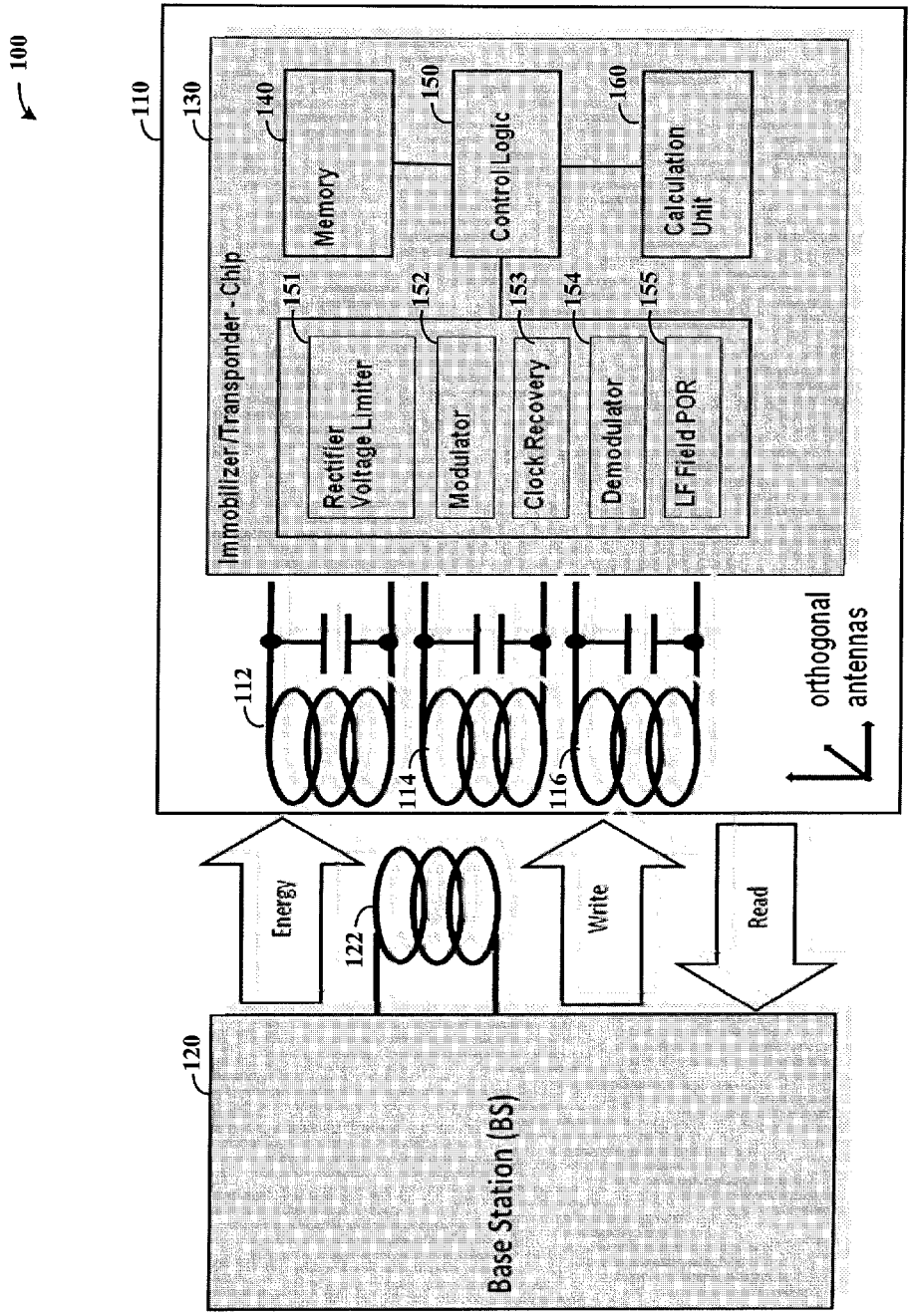
FIG. 1 shows an immobilizer and immobilizer system, in accordance with an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims. The term "example" as used throughout this application is only by way of illustration, and not limitation.

Aspects of the present invention are believed to be applicable to a variety of different types of devices, systems and arrangements for wireless communications involving transponder-base station coupling, including those involving immobilizer functions. While the present invention is not necessarily so limited, various aspects of the invention may be appreciated through a discussion of examples using this context.

Various example embodiments are directed to an immobilizer that addresses challenges, such as those identified in the background above. Other embodiments are directed to transponder-base station systems, which similarly address these and other challenges. In one embodiment, a transponder includes an arrangement of antennas that are configured to operate independently from a particular axis of orientation between the transponder and a base station and, in some implementations, to operate independently from any orientation of the transponder. In various contexts, the transponder is configured to operate independently from any need to insert the transponder, or a fob including the transponder, into a slot or other physical alignment arrangement in order to operate.

In accordance with various example embodiments, a transponder such as described above is further configured for operation using power supplied by an electromagnetic field (hereafter also "field") generated at the base station. The transponder is configured with antennas that are configured to facilitate both data transmission and energy transfer with the base station, independently from the orientation of the transponder relative to a field generated by the base station. One or more of the antennas receive data and/or power (via the field) generated by the base station, and further communicate a response back to the base station. A wireless power circuit at the transponder is used to generate power that the transponder uses for communications.

In a more particular example embodiment, an immobilizer device includes a transponder having a plurality of orthogonally-arranged antennas that facilitate communication and wireless energy transfer with a base station, in a manner that is generally independent from the orientation of the immobilizer device relative to the base station. In this context and as otherwise described herein, the terms orthogonally-arranged or orthogonal refer to antennas that are generally, though not necessarily precisely, orthogonal relative to one another. The antennas may be about orthogonal, or within a few degrees of orthogonal, or within about 20 degrees of orthogonal.

In one implementation, the immobilizer device includes three orthogonally-arranged antennas configured to operate for both data and power communication in a field generated by the base station, and for immobilizing functions relative to the activation (or lack thereof) of one or more systems based upon the establishment of communications with the system. The immobilizer is configured for seamless operation, and to effect both data and power communication without necessarily requiring physical alignment with a base station. Each antenna provides a corresponding communication channel. The immobilizer is configured for operation on any one of the channels, with a subset of the channels, or all channels (e.g., simultaneously). Energy, data and, in some implementations, a clock signal are derived from the channels. Where a clock signal is derived, the immobilizer device uses the clock signal to control operation of a communications circuit in the transponder, for communicating with the base station.

Upon the introduction of the immobilizer device into a field generated by the base station, the immobilizer device functions to authenticate or otherwise establish communications between the immobilizer device and the base station, and is configured to do so using one, two or all three of the antennas. While a variety of communications protocols and related steps can be implemented, in accordance with various implementations, once the communications have been established/authenticated, additional data communications can be effected for operating a system that the base station is part of (e.g., such as to initiate ignition of an automobile).

Another example embodiment is directed to an immobilizer device that communicates with a remote base station to permit the operation of a circuit, such as an ignition circuit, connected to the base station. Three orthogonally-oriented antennas are configured to receive wireless transmissions from the base station, and to provide a signal corresponding to the transmissions on a channel, with three such channels being provided as corresponding to each of the antennas. A wireless power circuit provides power using signals received from the base station via at least one of the three antennas. A logic circuit is powered by the wireless power circuit and processes data signals received from the base station, and generates return communications that enable operation of the aforesaid circuit (e.g., ignition circuit). A communications circuit is also powered by the wireless power circuit, and is connected to the antenna circuit to generate signals corresponding to the received wireless transmissions on each of the antennas, and provide each generated signal on channel corresponding to the antenna. Generating such signals may include, for example, using a signal received on one of the channels and synchronizing the delivery of the signal with a clock signal. The communications circuit also provides data communications to the logic circuit, as received from the base station via at least one of the channels, and transmits data to the base station via an antenna corresponding to one of the channels.

In a more particular example embodiment, a key fob includes an immobilizer (transponder) that is configured to operate using power from an electromagnetic field provided by a vehicular base station system, such as may be implemented as part of an ignition for an automobile or other vehicle. Power transmission via the electromagnetic field is effected using, for example, loosely coupled antenna coils configured as resonance circuits. The key fob includes a housing and circuitry for communicating information with the vehicle, such as for enabling or disabling an ignition system. In many implementations, a key fob as discussed herein is further configured for operation with a passive keyless entry system, to facilitate entry to a vehicle (e.g., to unlock the vehicle's door).

The key fob may further include a battery that can be used to power one or more aspects of the key fob, which may include power for the use of the fob as an ignition component. In this context, the power transmission facilitated via the electromagnetic field may be used in response to loss of battery power, as an alternative to battery power, or in conjunction with battery-powered activity. For example, where hybrid battery/wireless power is used, battery power can be used if the fob is not positioned within a reliable distance from the base station that results in sufficient power transmission to operate the fob. When sufficient power is derived from the base station, battery power can be bypassed in lieu of power received via the electromagnetic field, to promote battery life. Circuitry within the fob is appropriately configured to use whichever power source is appropriate. In such situations and where applicable, a default power setting is to receive power via the electromagnetic field, to ensure operation when battery failure occurs. Accordingly, the fob can operate independently from the key fob battery status.

In some implementations, data transmission is effected using, for example, FSK (frequency shift keying), PSK (phase shift keying) or ASK (amplitude shift keying), such as for communicating data that can be used to unlock or otherwise enable a vehicle's ignition system. The antennas in the base station and/or the immobilizer may include cylindrical coils or other types of antennas. The coupling between the antennas is enhanced by arranging the antennas relative to one another to ensure that an antenna in the immobilizer is on the same general axis position as an antenna in the base station (to facilitate coaxial operation). In applications in which the base station antenna area is much larger than the transponder antenna, communication (both power and data) can be effected without precise coaxial operation, but may involve positioning the axis of one of the transponder antennas close to a center axis of the base station antenna, with relatively small angular deviation for desirable operation (e.g., corresponding to a very small dihedral angle for a range of a few millimeters).

Immobilizers and immobilizer systems as described herein can be implemented in a variety of manners. In one implementation, an immobilizer includes a base station (transceiver) and a transponder device. The immobilizer includes two input pins connected to an antenna. The antenna can be external to the immobilizer, and where appropriate, internal to a key fob in which the immobilizer is implemented. In some implementations, the antenna includes an LC resonant circuit that uses either discrete components on a PCB or an external coil, and an integrated capacitor.

The immobilizer also includes a transponder circuit that operates upon an input signal or signals received from a base station, via the antenna. The transponder circuit includes a rectifier or charge pump type of circuit that generates a supply voltage from the input signal or signals, and a clock recovery circuit that recreates a clock signal out of an available input signal. The transponder circuit also includes a demodulator (e.g., a comparator) that regenerates a data signal modulated on the input carrier signal, and modulator that modulates the carrier signal (e.g., via load modulation) to enable data transmission back to the base station. A control unit, such as a state machine or a programmed microcontroller, and a calculation unit are configured to handle protocols for operating the immobilizer. A memory device such as a non-volatile memory circuit is used to store data for operation of the transponder circuit and/or relative functions, such as to store authentication-type data usable for enabling an automotive ignition (e.g., without the authentication-type information, the ignition is immobilized and will not start a vehicle).

Turning now to the Figures, FIG. 1 shows an immobilizer device 110, and immobilizer system 100, in accordance with other example embodiments of the present invention. Various embodiments are directed specifically to the immobilizer device 110, and other embodiments are directed to the immobilizer system 100, including the immobilizer device. In addition, various other embodiments are directed to an immobilizer device 110 that is integrated in a key fob or other device that uses the immobilizer device for operation.

The immobilizer device 110 is configured to communicate with a base station 120 for both data and power transmission. The base station 120 includes an antenna 122, represented as a coil by way of example, that is configured to transmit energy and data (e.g., write data), and to receive data (e.g., read data) from the immobilizer device 110. On the immobilizer side of the communications, three antennas 112, 114 and 116 are configured for energy and data communication with the antenna 122, and are also represented as coils by way of example.

In addition to the antennas, the immobilizer device 110 includes an immobilizer/transponder chip 130, which has a plurality of transponder circuits including memory 140, control logic 150 and a calculation unit 160. The control logic 150 is further in communication with a rectifier/voltage limiter 151, a modulator 152, a clock recovery circuit 153, a demodulator 154 and a low frequency (LF) field power on reset (POR) circuit 155, the latter of which can be implemented to ensure at least a threshold minimum level of power is available for operation. In some implementations, the POR circuit 155 is configured to detect the field on a received signal to set a status signal whenever the corresponding input channel voltage is beyond a certain threshold (e.g., as described in connection with clock recovery circuits 312, 324 and 334 of FIG. 3 below). In some embodiments, a charge pump is used instead of a rectifier, such as described above.

The immobilizer/transponder chip 130 receives the channel outputs of the respective antennas 112, 114 and 116, and uses one or more of the channels from which to draw energy from the field generated on coil 122. More particularly, the LF POR circuit 155 generates a reset signal to initiate operation in response to receiving a communication from the base station, which effectively indicates that the immobilizer device 110 is within a certain distance from the base station 120. The rectifier/voltage limiter 151 generates a supply voltage from the input signal or signals, in order to power the chip and/or other components of the immobilizer device 110.

The immobilizer/transponder chip 130 also uses one or more of the channels to obtain data from the base station 120, optionally using the same channel via which power is received. The clock recovery circuit 153 recreates a clock signal using data received from the base station, on one or more channels (and optionally, using a signal channel having the best signal strength). The demodulator 154 regenerates a data signal modulated on the input carrier signal, and the signal is provided for use in the immobilizer device 110.

When the immobilizer/transponder chip 130 is to communicate back to the base station, the modulator 152 modulates the received signal (e.g., via load modulation), in order to facilitate data transmission back to the base station. One or more channels can be modulated simultaneously; where appropriate, a channel exhibiting a highest voltage (and related signal strength) can be used as providing the best signal. The control logic circuit 150 (e.g., a state machine or a programmed microcontroller) and calculation unit 160 are configured to handle protocols for operating the immobilizer device 110. A memory circuit 140 stores data for operation of the transponder device 110 and/or relative functions, such as by storing software executed by the control logic 150.

Figure 2:
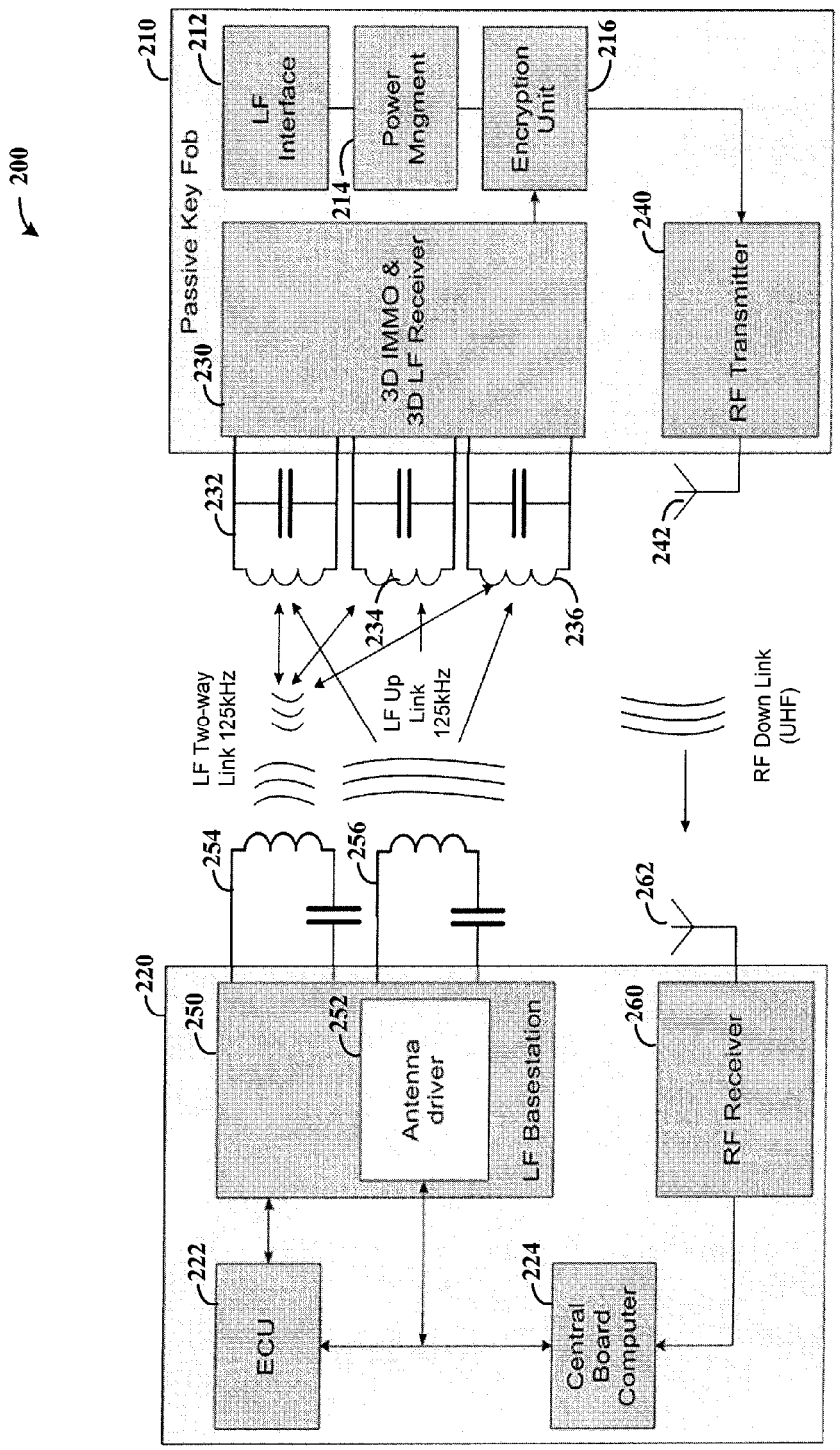
FIG. 2 shows an immobilizer and immobilizer system with a represented three-dimensional antenna system, in accordance with another example embodiment of the present invention.

FIG. 2 shows an immobilizer and immobilizer system 200 with a three-dimensional antenna system, in accordance with another example embodiment of the present invention. The system 200 includes a passive key fob 210 that communicates with a base station 220, which is part of and/or communicatively coupled with a system such as a vehicle ignition system. As with the discussion of FIG. 1 above, various embodiments are directed to the fob 210 alone, and other embodiments are directed to a system including the base station 220.

The fob 210 includes a low frequency interface circuit 212, a power management circuit 214, and an encryption unit 216. The fob 210 also includes a three-dimensional (3D) immobilizer and low-frequency (LF) receiver circuit 230, which is coupled to three antennas 232, 234 and 236. These antennas are arranged orthogonally, and configured such that one of the antennas is generally aligned with an antenna at the base station 220, independently from any orientation of the fob 210.

The antennas 232, 234 and 236 provide signals received from the base station on three separate channels, one for each antenna. The 3D receiver circuit 230 is configured to evaluate signals on each of these channels for consideration in using the signals for immobilizer functions and/or data communications. Such evaluation may involve, for example, determining a power level, or a modulation index, for each channel and selecting one of the channels exhibiting the strongest signal, or selecting two or more of the channels exhibiting a signal meeting/exceeding a particular threshold. Such a threshold may be defined, for example, to suit a particular application and stored as a value accessible for use in comparing to a value corresponding to the channel signal strength to determine whether the signal strength of the channel meets or exceeds the threshold. Accordingly, the fob 210 uses signals on one, two or all three channels for immobilization, depending upon the implementation. When a signal has been acquired, the fob 210 processes two-way link data to ensure secure communications, using the encryption unit 216 as appropriate.

The fob 210 optionally draws power from the signals received on one or more of the antennas 232, 234 and 236, such as when battery power on the fob 210 is lost and/or otherwise unavailable. The low-frequency (LF) interface circuit 212 and power management circuit 214 operate to control the power received and otherwise interface with the low frequency signals received on the antenna(s).

A variety of base stations may be used in connection with the embodiment(s) shown in FIG. 2. In the embodiment exemplified in FIG. 2, base station 220 includes an engine control unit (ECU) 222 and a central board computer 224. A low-frequency (LF) communications circuit 250 includes an antenna driver 252, and is connected to antennas 254 and 256. The antenna 254 generates and receives low-frequency signals, and the antenna 256 generates a low frequency uplink signal.

Depending upon characteristics of the base station and the fob 210, power may be derived at varied distances. In some implementations, the fob 210 is configured to draw power from the base station 220 (or another base station) at distances of up to about 10 cm, at voltages on the antenna of between about 3V and 8V. When battery power is available, the fob 210 is configured to communicate with the base station 220 at ranges of up to about 6 m at antenna voltages of between about 100 µV and 5V with a backlink via RF or RF-RF communication, after receiving a LF wakeup signal via the antennas. This high-range battery power may be used, for example, as part of a keyless entry system for a vehicle, in which the RF power operation can be used for another function such as keyless entry. For long-range operation, the RF antenna 262 in the base station 220 (or another base station) may be located at remote locations, such as in a vehicle's mirrors or roof.

The respective antennas on the fob 210 are all configured to send and receive low-frequency communications (shown with antenna 254), and to receive a low-frequency up-link signal (shown coming from antenna 256). Accordingly, the antennas 232, 234 and 236 are all configured to receive power via a field generated by a base station, and also to communicate with the base station, under low frequency. By way of example, such frequencies as may be applicable to the embodiments shown in FIG. 2 are frequencies of about 125 kHz. Accordingly, other frequencies are used for different applications, such as a frequency in the range of 20 kHz to 150 kHz.

The system 200 is shown as optionally including an RF communications system involving an RF transmitter 240 on the fob 210, and an RF receiver 260 on the base station 220. The fob 210 is configured to generate RF communications for communication to the base station 220 via the RF transmitter 240. In many implementations, the RF communications system is battery-powered, and used for a function that is different than that effected via the immobilizer functionality of the 3D receiver circuit 230. For instance, when the fob 210 is used in automotive applications, the RF communications circuit can be implemented as a keyless entry function, with the immobilizer functions implemented for vehicle ignition.

In an alternate embodiment, this RF communication is carried out using power drawn from the field generated by the base station 220 and/or another similar base station, and received on the antennas at the fob 210 (e.g., once immobilizer functions have been carried out using the antennas 232, 234 and 236. For example, if the RF communications circuit is implemented for battery-powered keyless entry function, and if the battery fails, a user can position the fob 210 to receive power sufficient to enable vehicular keyless entry RF communications, and again position the fob 210 to receive power sufficient to enable vehicular ignition functions.

In some implementations, the RF transmitter 240 is an RF transceiver configured to both send and receive RF transmissions in bi-directional communications. In these implementations, the low-frequency (LF) receiver function of the 3D receiver circuit 230 may be limited in use to that of a wakeup function, to initiate (e.g., wake up) the passive key fob 210 from a low-power type of state.

Figure 3:
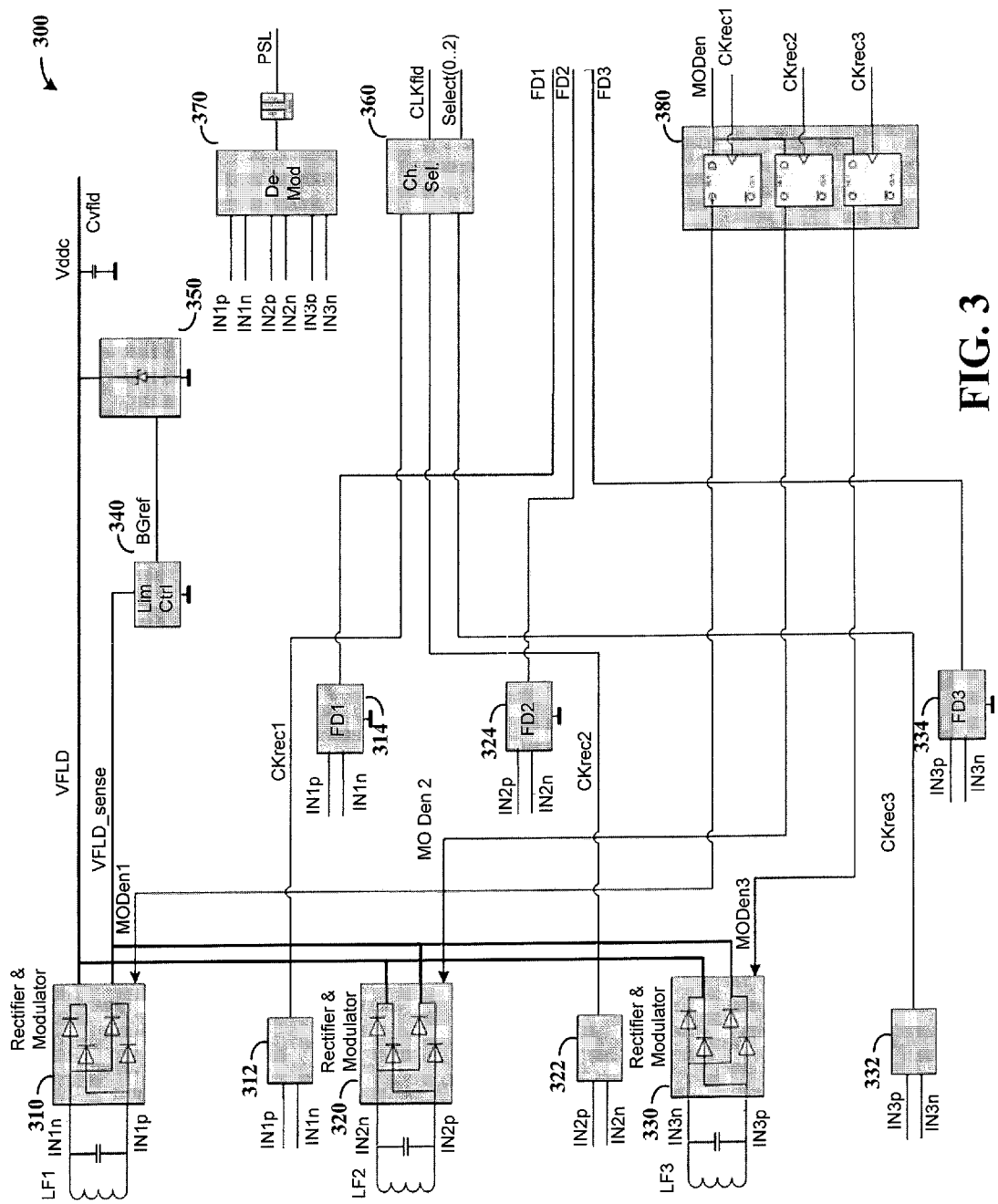
FIG. 3 shows an immobilizer circuit, in accordance with another example embodiment of the present invention.

FIG. 3 shows an immobilizer circuit 300, in accordance with another example embodiment of the present invention. The immobilizer circuit 300 can be implemented as part of an immobilizer device and/or key fob as described herein, such as shown in FIG. 2 and described above. Three antenna devices 310, 320 and 330 are shown, each device having an antenna coil, a rectifier and a modulator. These antenna devices respectively provide an output channel having sense and limit outputs, with a limit controller 340 connected to the sense output and defining a clamping voltage, and a voltage limiter 350 connected to the limit output to limit the input voltage. While a single limiter 350 is shown, other embodiments are directed to implementations in which a separate rectifier is used for each antenna device.

Each of the antenna devices 310, 320 and 330 has corresponding clock recovery and field detection circuits, respectively including clock recovery circuits 312, 322 and 332, and field detection circuits 314, 324 and 334. The clock recovery circuits 312, 322 and 332 are connected to a channel selector circuit 360. The field detection circuits 314, 324 and 334 check whether the amplitude on the corresponding inputs to which they are connected is above a certain threshold. This information is provided to the channel selector circuit 360, which uses the information to make a decision as to which clock recovery channel to use as a clock source for the digital domain (e.g., the input with the highest amplitude may be selected).

A demodulator 370 receives each of the input signals on respective channels as provided at antennas of devices 310, 320 and 330. The demodulator 370 evaluates the strength of the signals on each channel (e.g., relative to one another), possibly simultaneously, and selects the channel providing the strongest signal. In some implementations, the demodulator 370 evaluates the strength of the channels by selecting a channel exhibiting the highest modulation, relative to the other channels. This selected channel is used to provide a demodulated output for processing within an immobilizer device.

A modulation circuit 380 provides a modulation signal (MODen) to each of the antenna devices derived from either one of the three channels, or from a local oscillator reference with the input signal phase of all three channels individually. In some implementations, the modulation circuit 380 uses the outputs form the clock recovery circuits 312, 322 and 332 (together with an enable signal) to re-synchronize the modulation signal, which can be helpful for avoiding phase jumps during modulation and corresponding spikes in the clock signal. The respective clock recovery circuits thus facilitate independent clock recovery on all three channels.

Accordingly, as the immobilizer is moved and the respective antennas on devices 310, 320 and 330 are moved in the field generated by a base device, the relative strength of the signals at the antennas can be monitored and used to select a channel over which communications will take place. Furthermore, other important functionality such as clock synchronization, is carried out to maintain a smooth transition as the device is oriented differently. In this context, the immobilizer circuit 300 checks the signal strength on various signals at an interval that permits movement of the fob or other circuit in which the immobilizer is employed.

Figure 4:
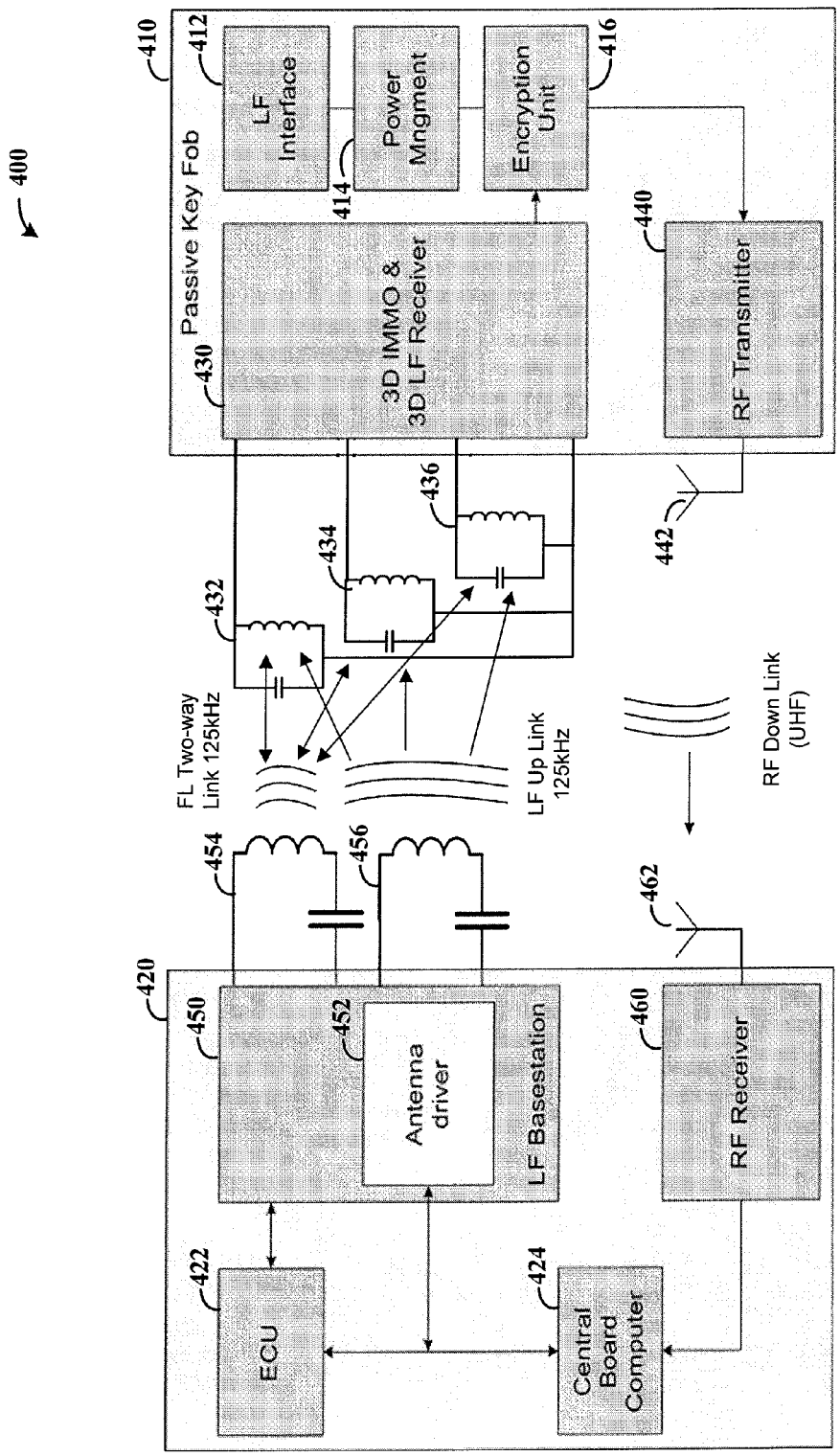
FIG. 4 shows another immobilizer and immobilizer system with another three-dimensional antenna system, in accordance with another example embodiment of the present invention.

FIG. 4 shows another immobilizer and immobilizer system 400 with another three-dimensional antenna system, in accordance with another example embodiment of the present invention. The immobilizer system 400 is similar to the immobilizer system 200 shown in FIG. 2, having a different three-dimensional antenna system. Accordingly, components in the system 400 having reference numbers similar to those in FIG. 2 (e.g., 420 and 220) may be implemented in a manner as discussed with FIG. 2 above. As such, detailed description of these components is omitted here for brevity.

Relative to the system 200, the antenna arrangement in the system 400 is arranged such that the individual antennas 432, 434 and 436 share a common ground, with the other links of each antenna connected to 3D immobilizer circuit 430. This approach can be used, for example, with the system being configured to operate under conditions in which a negative voltage may be present on the input pins, to limit the number of pins required, which can save space and cost.

Based upon the above discussion and illustrations, those skilled in the art will readily recognize that various modifications and changes may be made to the present invention without strictly following the exemplary embodiments and applications illustrated and described herein. For example, a variety of different shapes, arrangements and numbers of antennas can be used to facilitate the communication, to suit particular applications. One such modification involves the use of differently-arranged antennas. For instance, a transponder as discussed herein may include more than three antennas, with each antenna located relative to the other antennas such that data and power transmission with a base station (e.g., as above) are facilitated in a manner that provides operability that is generally independent from the orientation of the transponder. Such antennas may be spaced about equally relative to one another in three dimensional space, or otherwise arranged such that a three-dimensional spacing between each antenna and at least one other antenna is less than such antennas in an orthogonal arrangement. In other implementations, a keyless fob as discussed above is used for an ignition system as well as a keyless entry system, with similar and/or added functionality. Such modifications do not depart from the true spirit and scope of the present invention, including that set forth in the following claims.

What is claimed is:

1. An immobilizer device for communicating with a base station for operation of a circuit connected to the base station, the immobilizer device comprising:
    an antenna circuit including three antennas orthogonally-oriented relative to one another, each antenna being configured to receive wireless transmissions from a remote base station;
    a wireless power circuit connected to the antenna circuit and configured to provide power using signals received from the base station via at least one of the three antennas;
    a communications circuit powered by the wireless power circuit, connected to the antenna circuit and configured to
        generate signals corresponding to the received wireless transmissions on each of the antennas, and provide each generated signal on a channel corresponding to the antenna,
        provide data communications received from the base station via at least one of the channels, and
        transmit data to the base station via an antenna corresponding to one of the channels; and
    a logic circuit configured to process data communications on at least one of the channels, and to generate a data communication for transmission to the base station using the communications circuit and the one of the antennas corresponding to the at least one of the channels.

2. The immobilizer device of claim 1, wherein the communications circuit is configured to provide data communications received from the base station via at least one of the channels, by selecting one of the channels exhibiting a signal strength that is higher than the respective signal strengths of the other channels, and providing data communications from the selected channel.

3. The immobilizer device of claim 1, wherein the communications circuit is configured to provide data communications received from the base station via at least one of the channels, by selecting one of the channels exhibiting a signal strength that exceeds a threshold and providing data communications from the selected channel.

4. The immobilizer device of claim 1, wherein the communications circuit is configured to transmit data to the base station via an antenna corresponding to one of the channels, by selecting one of the channels exhibiting a signal strength that is higher than the respective signal strengths of the other channels, and transmitting the data generated by the logic circuit via an antenna corresponding to the selected channel.

5. The immobilizer device of claim 1, wherein the communications circuit is configured to transmit data to the base station via an antenna corresponding to one of the channels, by selecting one of the channels exhibiting a signal strength that exceeds a threshold signal strength, and transmitting the data generated by the logic circuit via an antenna corresponding to the selected channel.

6. The immobilizer device of claim 1, wherein the communications circuit is further configured to
select one of the channels exhibiting a signal strength that is higher than the respective signal strengths of the other channels,
provide data communications received from the base station by providing the data communications received via the selected channel, and
transmit data to the base station via an antenna corresponding to one of the channels via the antenna corresponding to the selected channel.

7. The immobilizer device of claim 1, wherein the wireless power circuit is configured to provide power by simultaneously accessing signals received from the base station via at least two of the antennas.

8. The immobilizer device of claim 1, wherein the wireless power circuit is configured to provide power by simultaneously accessing signals received from the base station via all three of the antennas.

9. The immobilizer device of claim 1, wherein the communications circuit is configured to provide data communications received on at least two of the channels to the logic circuit for processing.

10. The immobilizer device of claim 1, wherein
the communications circuit is configured to select at least one of the channels exhibiting a threshold signal strength and to use the selected channel to provide a clock signal, and
the logic circuit is configured to operate using the provided clock signal.

11. The immobilizer device of claim 1, wherein
the communications circuit is configured to select at least one of the channels exhibiting a higher signal strength, relative to the other channels, and to use the selected channel to provide a clock signal, and
the logic circuit is configured to operate using the provided clock signal.

12. The immobilizer device of claim 1,
further including a local oscillator configured to generate a clock signal, and
wherein the logic circuit is configured to operate using the generated clock signal.

13. The immobilizer device of claim 1, wherein the communications circuit includes the logic circuit, and wherein the logic circuit and the communications circuit are configured and arranged to respectively generate and transmit a data communication via the one of the antennas corresponding to the at least one of the channels, using wireless power received via the wireless power circuit, the data communication being configured and arranged to cause the operation of at least one of an ignition circuit and an entry circuit connected to the base station.

14. The immobilizer device of claim 1, wherein the communications circuit is configured to communicate with the base station using a low-frequency signal in a range of between about 20 kHz and 150 kHz.

15. The immobilizer device of claim 1, further including a clock generation circuit configured to
generate a clock signal using a clock signal on one of the channels exhibiting a higher strength, relative to the other channels,
regenerate a clock signal by re-evaluating the signal strength of all of the channels, and using one of the channels exhibiting a higher strength, relative to the other channels, from which to derive a clock recovery signal, and
use the clock recovery signal to resynchronize the provided data communications received from the base station.

16. An immobilizer key fob device for communicating with a base station for an automobile ignition circuit that requires data from the immobilizer to operate, the immobilizer key fob device comprising:
an antenna circuit having three orthogonally-oriented antennas that respectively generate input signals on three different antenna channels, and configured and arranged to align with a field generated by a single-antenna in the base station for receiving RF communications from the base station;
a power circuit configured to generate a supply voltage using an input radio frequency (RF) signal received from the base station on at least one of the antennas;
a demodulator circuit configured to select one of the channels based upon a strength of a signal communicated thereupon, and to provide a data signal from the selected channel for processing;
a modulator circuit configured to modulate a carrier signal for data transmission back to the base station;
a memory circuit configured to store authentication data and program data; and
a logic circuit configured to execute the program data in the memory circuit to process data received via the antenna circuit and demodulator circuit, and to generate output data for communication back to the base station via the modulator circuit and antennal circuit, using the authentication data.

17. The device of claim 16, wherein the antennas in the antenna circuit are configured and arranged to receive an RF signal from the base station that is sufficient to power the immobilizer key fob device and to pass RF communications between the immobilizer key fob device and the base station, independently from the orientation of the immobilizer key fob device.

18. The device of claim 16, wherein the demodulator circuit is configured to monitor the strength of the signals on each of the channels and, in response to one of the signals on another one of the channels that is not the selected channel overtaking the signal strength of the signal on the selected channel, provide the data signal from the other one of the channels.

19. The device of claim 16, further including a clock generation circuit configured to
generate a clock signal using an input signal received on one of the antenna channels, and synchronize the provided data signal using the clock signal, and
re-generate the clock signal by evaluating the strength of the signals on each of the channels and using the signal from the channel exhibiting the highest signal strength to re-generate the clock signal.

20. A method for implementation at an immobilizer circuit for communicating with a remote base station using RF power, the method comprising:
using an antenna circuit having three antennas orthogonally-oriented relative to one another, receiving wireless transmissions from the base station;

using the wireless transmissions received on the antenna circuit from the base station to generate power to power a logic circuit;

generating signals corresponding to the received wireless transmissions on each of the antennas, and providing each generated signal on a channel corresponding to the antenna;

providing data communications received from the base station via at least one of the channels to the logic circuit;

in the logic circuit, processing data communications received on at least one of the channels, generating a data communication for transmission to the base station using the communications circuit and the one of the antennas corresponding to the at least one of the channels; and transmitting the generated data communication to the base station via an antenna corresponding to one of the channels.

* * * * *